United States Patent [19]
Woof

[11] Patent Number: 5,832,840
[45] Date of Patent: Nov. 10, 1998

[54] TILT ADJUSTABLE MOUSE SURFACE MOUNTING BRACKET

[75] Inventor: Michael Woof, Guelph, Canada

[73] Assignee: Waterloo Furniture Components, Ltd., Kitchener, Canada

[21] Appl. No.: 476,688

[22] Filed: Jun. 7, 1995

[51] Int. Cl.[6] .................................................. A47F 5/12
[52] U.S. Cl. .......................... 108/6; 248/288.31; 248/918
[58] Field of Search ................... 108/1, 5, 142, 108/149; 248/288.31, 288.51, 324, 289.11, 323

[56] References Cited

U.S. PATENT DOCUMENTS

| | | | |
|---|---|---|---|
| 161,026 | 3/1875 | Grummon | 108/5 |
| 573,960 | 12/1896 | Bruss | 248/289.11 |
| 938,219 | 10/1909 | Crume | 108/1 |
| 2,121,525 | 6/1938 | Johnson | 248/288.51 |
| 3,591,118 | 7/1971 | Gentile | 248/288.31 |
| 4,616,789 | 10/1986 | Matsui et al. | |
| 4,844,388 | 7/1989 | Kuba et al. | 108/5 |
| 5,037,054 | 8/1991 | McConnell | |
| 5,257,767 | 11/1993 | McConnell | |

*Primary Examiner*—Peter M. Cuomo
*Assistant Examiner*—Gerald A. Anderson

[57] ABSTRACT

The present invention relates to a tilt adjustable mousing surface mounting bracket. This mounting bracket operates between a primary work surface and a secondary work surface. The adjustable bracket includes a mounting section which is associated with the secondary work surface. The mounting section is pivotally associated with a pivot joint which is in turn mounted on the primary work surface. The pivot joint allows for both pivotal movement and tilting movement of the secondary work surface. In addition, the bracket includes a means for securing the pivot joint against movement whereby the secondary work surface can be locked into place.

8 Claims, 2 Drawing Sheets

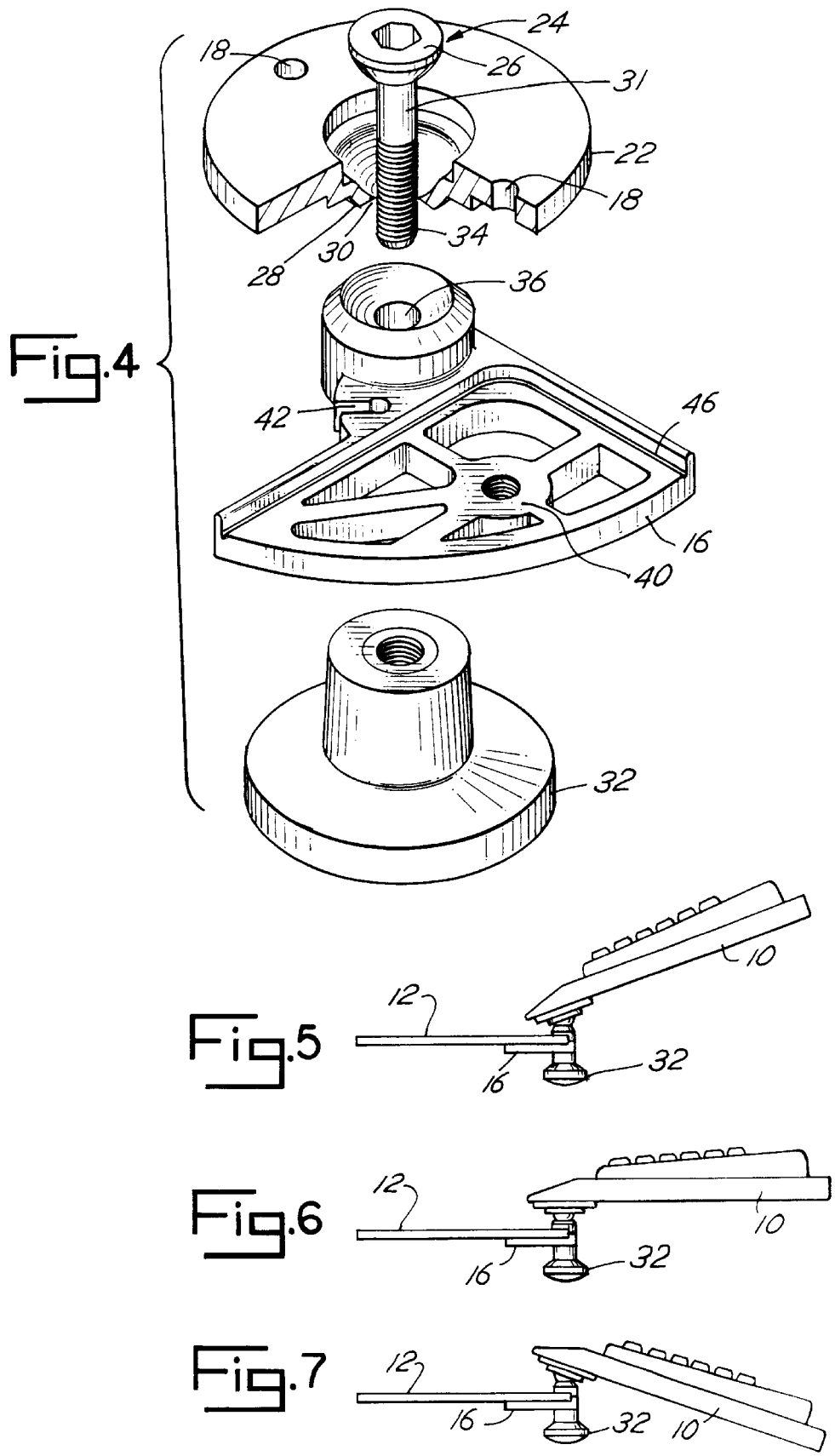

TILT ADJUSTABLE MOUSE SURFACE MOUNTING BRACKET

BACKGROUND OF THE INVENTION

1. Field of the Invention

The present invention relates to the field of adjustable brackets for support of work surfaces. More precisely, the present invention relates to adjustable brackets useful for supporting computer devices such as computer keyboards or mouses that allows adjustment both with respect to a horizontal axis and with respect to a vertical axis. Even more precisely, the present invention relates to the field of work surface support devices which support a secondary work surface pending from a primary work surface.

2. Description of the Prior Art

In recent years, it has become popular to equip work stations with keyboard support trays that allow the keyboard to be stored in or under the workstation. Such keyboard support trays are shown in U.S. Pat. Nos. 4,616,798, 5,037,054 and 5,257,767. These support trays have become more popular with the awareness relating to repetitive strain injury ("RSI") or carpel tunnel syndrome. Many of these trays provide for the adjustment of the keyboard to an angle that will relieve the strain on the operator associated with typing at a keyboard for extended periods. Use of these keyboard support trays, however, has caused a problem relating to computers that also use a detached mouse. Because the computer keyboard tray, when in use, is in front of the workstation, the operator is often quite removed from the workstation itself. Moreover, the computer keyboard trays often do not have enough room in which to support a mouse. Therefore, it becomes inconvenient for the operator to have to reach over the keyboard support tray to reach a mouse resting on the workstation itself. Moreover, even when the computer keyboard support tray does have sufficient room for a mouse, when the tray is tilted to improve the comfort of the operator, the mouse is then forced to operate on an inclined surface, making operation of the mouse more difficult. Thus, there is a need for a device which provides a work surface for a mouse and other computer peripherals that can be mounted on a primary work surface, whether it be a workstation or a computer keyboard tray, that provides the mouse with an adjustable surface such that the service can be maintained in a level orientation.

SUMMARY OF THE INVENTION

The present invention relates to a tilt adjustable mousing surface and the associated mounting bracket. This mounting bracket operates between a primary work surface and a secondary work surface. The adjustable bracket includes a mounting section which is associated with the secondary work surface. The mounting section is pivotally associated with a pivot joint which is in turn mounted on the primary work surface. The pivot joint allows for both pivotal movement and tilting movement of the secondary work surface. In addition, the bracket includes a means for securing the pivot joint against movement whereby the secondary work surface can be locked into place.

The advantages of the present invention are many. Specifically, the present invention provides a simple and economic method for attaching a shelf to a moveable keyboard support tray that provides a surface on which a mouse can be placed and a surface can be maintained in a level orientation.

Additionally, the present invention provides the advantage of providing a mousing work surface which can be swiveled into a storage position.

The present invention also has the advantage of being able to mount to virtually any primary work surface to provide an attachment for a mousing surface.

The present invention is also advantageous in establishing a more compact work area and bringing convenience to a computer operator. Specifically, a computer operator will now have a mousing surface available without the operator having to reach or strain to operate a mouse.

Therefore, it is the object of the present invention to provide an adjustable shelf that can be used for supporting of various items, including a computer mouse.

It is also the object of the present invention to provide an adjustable shelf mechanism that can be attached to a storable computer keyboard support and adjusted such that when the computer keyboard support is tilted that the attached shelf can be maintained in a level orientation.

Further object of the present invention provide an adjustable shelf for supporting of a computer mouse which is storable. These and other objects and advantages of the present invention will become more clear in the following detailed description.

BRIEF DESCRIPTION OF THE DRAWINGS

FIG. 4 is a exploded view of the pivot joint;

FIGS. 5–7 show the primary work surface and the secondary work surface held at different angles by the pivot joint.

DETAILED DESCRIPTION OF THE INVENTION

Figure 1:
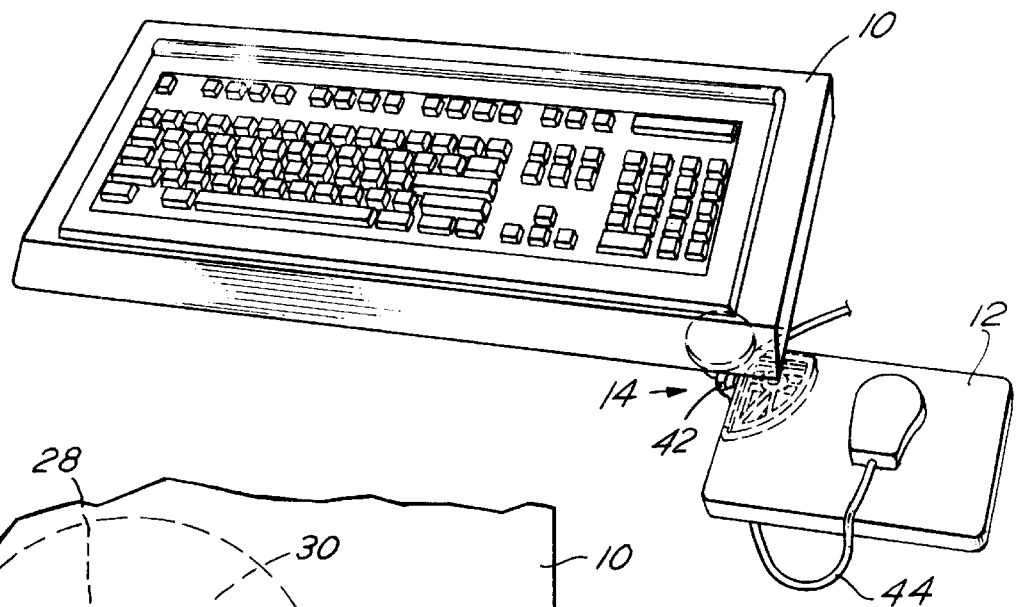
FIG. 1 is a perspective view of the work surface, pivot joint and secondary surface of the invention.

The present invention relates to an adjustable shelf bracket that is attached to a primary work surface 10 and supports a secondary work surface 12. The adjustable bracket 14 consists of three principal parts: 1) a secondary surface mounting section 16, 2) a pivot joint 20 and 3) a pivot joint locking structure.

A preferred embodiment of the present invention is illustrated in FIG. 1–4. Referring to FIG. 1–4 collectively, the pivot joint 20 comprises a pivot mount 22 and a swivel pin 24. The pivot mount 22 defines a pivot well 28 and an aperture 30. The aperture 30 is located at the bottom of the pivot well 28. The pivot mount 22 defines holes 18 which allow it to be secured to the bottom of the primary work surface 10 by any normal means, including a screw or a nail. The swivel pin 24 includes a shaft 31. The shaft 31 is threaded at one end and defines a swivel pin head 26 at the other end. This swivel pin head 26 is adapted to conform to the shape of the pivot well 28. The swivel pin 24 passes through the aperture 30 such that the swivel pin head 26 seats in the pivot well 28 in a manner that it operates like a ball and socket joint. The aperture 30 is sized sufficiently to allow the swivel pin 24 to pivot 360 degrees and move through an appropriate arc. Preferably, the aperture 30 is beveled outwardly, thereby providing sufficient room for the shaft 31 of swivel pin 24 to move through an arc.

The secondary surface mounting section 16 is pivotally mounted on the swivel pin 24 under the pivot mount 22. In a preferred embodiment the shaft 31 of the pivot pin 24 passes through a channel 36 in the mounting section 16. The mounting section 16 extends outwardly from this pivotal mount to define a mounting surface 40. The secondary work surface 12 is then mounted upon the mounting surface 40. This mounting can be accomplished by any ordinary means, such as mounting screw 38. Preferably, the mounting section 16 defines a rim 46 which is sized and positioned to mate with the edge of the secondary work surface 12. In this manner the secondary work surface 12 can be securely affixed to the mounting surface with a single screw 38 without concern for pivot about the screw 38.

As mentioned above, the swivel pin 24 is preferably provided with a threaded portion 34. This threaded portion 34 of the swivel pin 24 threadably associates with a knob 32. More particularly the knob 32 is adapted to receive the threaded potion 34 of the swivel pin 24. When the knob 32 is tightened onto the threaded portion 34 of the swivel pin 24, the knob 32 fixes the swivel pin 24 from movement within the pivot well 28. In addition, the tightening of the knob 32 puts pressure upon the mounting section 16 pressing it against the pivot mount 22 and thereby preventing its rotation about the swivel pin 24.

It should be understood that while the preferred embodiment includes a knob 32, other mechanism can be used to secure the pivot pin 24 against movement within the pivot well 28. For example a lever with a cam lock is a possible alternative. Such alternatives are well known to one skilled in the art.

Figure 2:
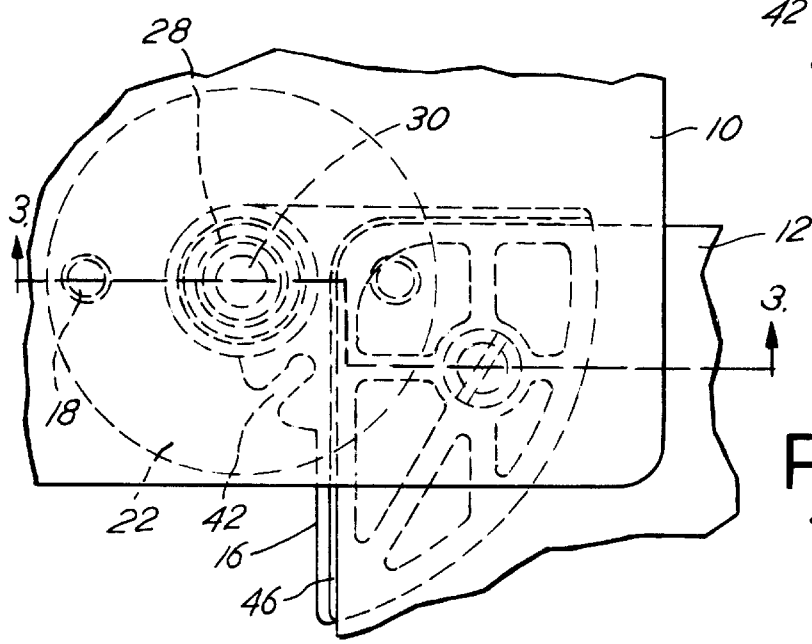
FIG. 2 is a top plan view through the pivot joint.
Figure 3:
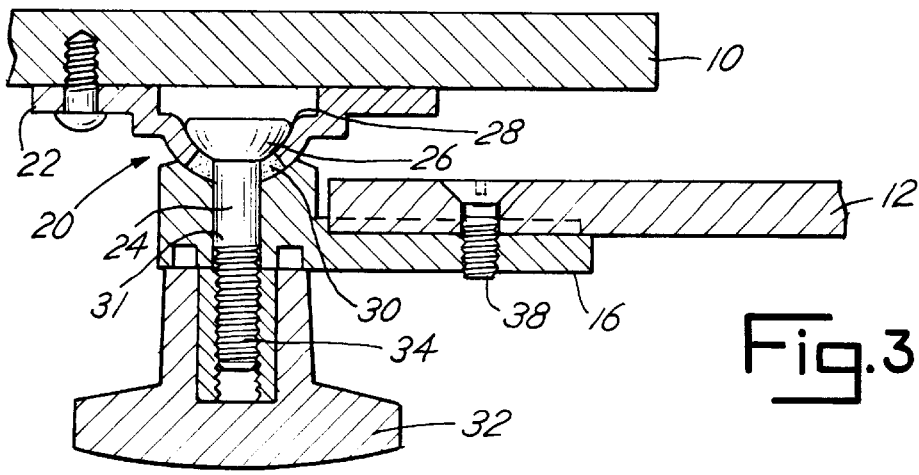
FIG. 3 is a cross-section view through the pivot join.

In a preferred embodiment the mounting section 16 includes a cord notch 42. This notch is illustrated in FIGS. 1, 2 and 4. This notch 42 is adapted to clasp the cord 44 of a mouse or other computer equipment. This structure serves the beneficial purpose of keeping the cord 44 from becoming entangled when the orientation of the secondary work surface 12 is altered.

Operation of the present invention, once installed, is simple and efficient. First, the knob 34 is loosened allowing the pivot pin 24 to freely move inside of pivot well 28. Second, the secondary work surface 12 is adjusted to the desired orientation. The orientation can be adjusted by moving about a horizontal axis (tilting the secondary work surface 12) and a vertical axis (pivoting the secondary work surface 12). Finally, once the secondary work surface 12 is in the desired orientation the knob 34 is tightened locking the secondary work surface 12 into position. FIGS. 5, 6 and 7 illustrate how the orientation of the secondary platform 12 can be maintained while the orientation of the primary work surface 10 is altered.

The present invention also allows the secondary work surface 12 to be stored underneath the primary work surface 10. When the knob 32 is loosened the mounting section 16 is no longer pressed against the pivot mount 22. Thus, the mounting section 16 and the attached secondary work surface 12 can then be pivoted about swivel pin 24 to a position under the primary work surface 10.

I claim:
1. An adjustable shelf comprising, in combination:
   a primary work surface;
   a secondary work surface;
   an adjustable bracket for mounting the secondary work surface to the primary work surface, said bracket including:
      a mounting section attached to the secondary work surface;
      a ball and socket pivot joint connecting the mounting section to the primary work surface; said pivot joint comprising, a pivot mount mounted on the primary surface, said pivot mount including a pivot well defining a socket with an aperture in said pivot well, a ball positioned in the socket with an extending swivel pin through the aperture and connected to the mounting section; and
      adjustable means for securing the pivot joint against movement and the swivel pin to the mounting section.

2. The adjustable shelf of claim 1 wherein the primary work surface is a computer keyboard support.

3. The adjustable shelf of claim 1 wherein the primary work surface is a desk.

4. The adjustable shelf of claim 1 wherein in the secondary work surface is a mouse pad.

5. An adjustable bracket for mounting a secondary work surface to a primary work surface comprising, in combination:
   a secondary work surface mounting;
   a ball and socket pivot joint connected to the work surface mounting, said pivot joint capable of providing both pivotal movement and tilting movement, the ball and socket pivot joint comprising:
      a pivot mount adapted to be mounted on a primary work surface, said pivot mount defining a pivot well as a socket with an aperture in said pivot well; and
      a ball in the socket with an extending swivel pin adapted to pass through the aperture and connect to the secondary work surface mounting.

6. The adjustable bracket of claim 5 further comprising a means for securing the pivot joint against movement and wherein the swivel pin includes a threaded portion, said means for securing the pivot joint against movement comprises a knob threadably associated with the swivel pin whereby when the knob is tightened the swivel pin is securely fixed in the pivot well preventing movement of the swivel pin with respect to the pivot well.

7. The adjustable bracket of claim 6 wherein tightening of the means for securing the pivot joint against movement also prevents the pivotal movement between the secondary work surface mounting and the pivot mount.

8. The adjustable bracket of claim 5 further comprising a means for securing the pivot joint against movement.

* * * * *